(12) United States Patent
Mastro

(10) Patent No.: US 7,212,620 B1
(45) Date of Patent: May 1, 2007

(54) SYSTEM AND METHOD FOR PROVIDING AN ANTI-TELEMARKETING FEATURE IN A TELEPHONY NETWORK

(76) Inventor: Michael Patrick Mastro, 6091 Sydney Dr., Huntington Beach, CA (US) 92647

( * ) Notice: Subject to any disclaimer, the term of this patent is extended or adjusted under 35 U.S.C. 154(b) by 326 days.

(21) Appl. No.: 09/707,571

(22) Filed: Nov. 6, 2000

(51) Int. Cl.
H04M 1/56 (2006.01)

(52) U.S. Cl. ............ 379/210.03; 379/196; 379/201.11; 379/134; 379/142.01; 455/412.2

(58) Field of Classification Search ............ 455/412.2, 455/415; 379/198, 142.01, 134, 210.02, 210.03, 379/196, 223, 67.1, 201.11, 121.01
See application file for complete search history.

(56) References Cited

U.S. PATENT DOCUMENTS

| | | | |
|---|---|---|---|
| 5,751,800 A * | 5/1998 | Ardon | 379/134 |
| 5,805,686 A * | 9/1998 | Moller et al. | 379/198 |
| 6,031,899 A * | 2/2000 | Wu | 379/142.01 |
| 6,253,075 B1 * | 6/2001 | Beghtol et al. | 455/415 |
| 6,259,779 B1 * | 7/2001 | Council et al. | 379/121.01 |
| 6,330,317 B1 * | 12/2001 | Garfinkel | 379/196 |
| 6,370,235 B1 * | 4/2002 | Heiner | 379/67.1 |
| 6,459,780 B1 * | 10/2002 | Wurster et al. | 379/142.02 |
| 6,519,332 B1 * | 2/2003 | Tovander | 379/196 |
| 2002/0012426 A1 * | 1/2002 | Gupton | 379/210.02 |
| 2002/0085700 A1 * | 7/2002 | Metcalf | 379/210.01 |
| 2003/0007625 A1 * | 1/2003 | Pines et al. | 379/223 |

* cited by examiner

*Primary Examiner*—Fan Tsang
*Assistant Examiner*—Md Shafiul Alam Elahee
(74) *Attorney, Agent, or Firm*—Wagner, Anderson & Bright, LLP; Roy L. Anderson

(57) ABSTRACT

An anti-telemarketing program uses the calling party identification of an incoming call to determine if the call is a telemarketing call by accessing a telemarketing database. The incoming call can be identified as a telemarketing call by direct correlation with a known telemarketing number or by indirect correlation by not being included within a list of known non-telemarketing numbers. If an incoming call is identified as a telemarketing call, and no override condition is set, the call will not be allowed to ring through to the desired phone line; instead, it will be terminated by a call progress tone or by a notification that the desired phone line does not accept calls from telemarketers. If an incoming call is not identified as a telemarketing call, it will be completed, and if it is from a telemarketer, the party receiving the call can designate the calling party identification from the call as belonging to a telemarketer. The designated calling party identification can be added to the telemarketing database when a preselected criterion for addition, such as independent verification or designation of the same number by multiple parties, is met.

10 Claims, 1 Drawing Sheet

Telemarketing Call Flow Diagram

SYSTEM AND METHOD FOR PROVIDING AN ANTI-TELEMARKETING FEATURE IN A TELEPHONY NETWORK

FIELD OF THE INVENTION

The present invention relates generally to telephony networks, and more specifically to a way of providing an anti-telemarketing feature to multiple telephone lines.

BACKGROUND OF THE INVENTION

Many consumers view telemarketing calls as an absolute curse. They come at all hours of the day, and at night. They come during breakfast, lunch and dinner. And, invariably, they come at some of the most inconvenient times possible, or so it seems.

One way to avoid telemarketing calls at inopportune times is not to answer the phone or to unplug the phone. However, this also excludes legitimate calls, such as calls from friends or family, and even emergency calls.

Anther way to avoid telemarketing calls is to use an answering machine to screen calls. Using this method, phone calls are allowed to ring, but the phone is typically not answered until the caller begins to leave a message on the answering machine. This solves the problem of missed calls, but only if the calling party decides to leave a message, and even then, it inconveniences the calling party who has to listen to a prerecorded message on the answering machine, wait for a beep to leave a message, and then begin to leave a message. In addition, there is still a disturbance caused both by the ringing phone, as well as the possible disturbance of undesired messages left by telemarketers. This can be compounded if the telemarketing call leaves a long message on an answering machine that must ultimately be reviewed to avoid loss of legitimate messages.

Still other ways of avoiding telemarketing calls rely upon various caller ID features implemented by an individual customer. One such method is to block all incoming calls without a caller ID. However, this method can also block legitimate calls, and it will not block telemarketing calls that do not block their ID. A related method is for the individual customer to screen incoming calls by their caller ID and use the caller ID in the same fashion as an initial voice in an answering machine. However, this method can also block legitimate calls, it does nothing to combat the disturbance of the ringing phone, and it requires additional effort by consumers to screen the incoming numbers. Still another such method is to create a preselected set of numbers that always ring, and then deal with other calls in one or more ways. However, this method, like the methods just noted, blocks legitimate calls, or suffers some of the other deficiencies already noted, depending upon what is done when an incoming call is not in the preselected set of approved numbers.

Thus, there is no good way to minimize telemarketing calls that does not suffer from serious drawbacks, despite the long felt need of tens of millions of consumers. Accordingly, an improved way to minimize telemarketing calls would represent a significant advancement in the state of the art.

While consumers have been frustrated with telemarketing calls for some time, there is also another side to this story. Telemarketing calls sell products, and thus make money. If they did not, they would stop. However, even though they make money, their efficiency is low. Thus, if there was a way to increase their efficiency, and even lessen their impact upon that portion of the public that detests them, both the public at large and those involved in telemarketing would benefit. This would represent an amazingly significant, and valuable, advance in the state of the art.

SUMMARY OF THE INVENTION

The present invention is generally directed to a system and method for minimizing undesirable telemarketing calls to subscriber telephone lines in a subscription base in which the calling party identification of incoming calls is used by an anti-telemarketing program to determine if the call should be completed or if some other action should be taken. If the incoming call is not identified as a telemarketing phone call, it is completed; if it is identified as a telemarketing call, it is not immediately completed, unless an override condition is set.

In a first, separate aspect of the present invention, the anti-telemarketing program can use one or more telemarketing databases to directly and/or indirectly identify telemarketing calls based upon the calling party identification of an incoming call. If there is a match between the incoming call calling party identification and any of a plurality of telemarketing telephone numbers contained within a telemarketing database, there is direct identification of the incoming call as a telemarketing call. If there is no match between the incoming call calling party identification and any of a plurality of non-telemarketing numbers contained within a telemarketing database, there is indirect identification of the incoming call as a telemarketing call.

In another, separate aspect of the present invention, when a telemarketing call is allowed to ring through to a subscriber phone line, the subscriber can designate the call as a telemarketing call, and the calling party identification can be added into a telemarketing database of known telemarketing numbers, through use of telemarketing identification logic, if a preselected criterion for addition is met. The preselected criterion can be that the calling party identification has been designated as a telemarketing telephone number by a preselected number of different subscribers within a given time period. The preselected criterion can also be an independent verification that the calling party identification is a telemarketing telephone number.

In still another, separate aspect of the present invention, an override condition is set when the calling party identification matches an excluded telemarketing telephone number. The override condition can be set by a subscriber or by a third party. If the override condition is set by a subscriber, it can be done by allowing the subscriber to access a customized subscriber database via a computer and selectively vary one or more override conditions for one or more telephone numbers contained in the telemarketing database, or a group of telephone numbers contained in the telemarketing database. A control system can be used to allow one or more telemarketing phone lines to complete a call with one or more subscriber phone lines when an override condition is set.

In yet another, separate aspect of the present invention, when: an incoming call is not completed because it is identified as a telemarketing call and no override condition is set, the incoming call may be terminated with a call progress tone and it is not allowed to ring through to the subscriber phone line. Alternatively, the incoming call can be provided with a notification that the subscriber at the selected phone line does not accept calls from telemarketers, and an anti-telemarketing flag can be set. If an improper telemarketing call is identified by detection of a set anti-telemarketing flag, a predetermined course of action can be taken.

It is especially preferred, but not required, that the method of the present invention be implemented in a public switched telephone network having a network telephony system, a subscription base (which preferably extends over multiple area codes) connected by the network telephony system, a logical telemarketing database and a control system. However, the present invention can also be implemented in other communications systems having access to a network telephony system.

Accordingly, it is a primary object of the present invention to provide a system and method for providing an anti-telemarketing feature in a telephony network.

This and further objects and advantages will be apparent to those skilled in the art in connection with the drawings and the detailed description of the preferred embodiment set forth below.

DETAILED DESCRIPTION OF THE PREFERRED EMBODIMENTS

Figure 1:
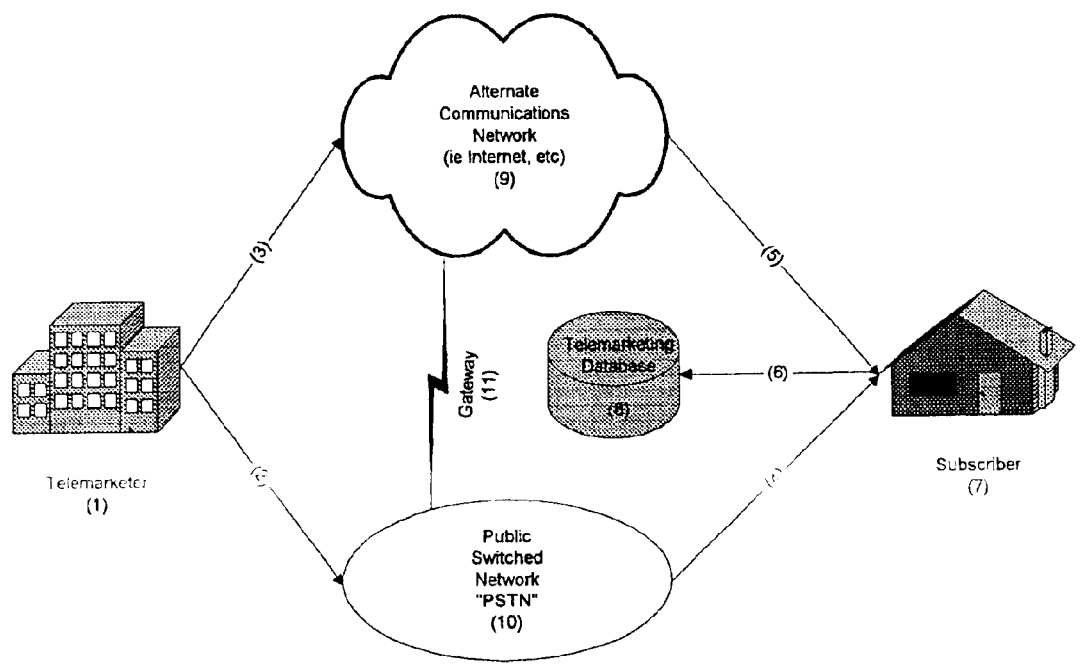
FIG. 1 is a telemarketing call flow diagram that illustrates potential flow pathways for a telemarketing call subject to the present invention.

A public switched telephone network ("PSTN") is a combination of individual phone lines, switches, and networks of switches. In a PSTN, individual phone lines are connected to a switch and switches are connected to other switches (typically in hierarchies) to form a network. A network telephony system includes multiple switches that link together individual phone lines to allow an individual phone line to communicate with other phone lines within the network.

Completing a call between two phone lines in the PSTN requires identification of both the originating phone line (calling party identification) and the telephone number called and generally relies upon two signaling methods that can run over various transmission media-user-to-network signaling and network-to-network signaling. In the United States, it is common to use Signaling System 7 ("SS7") network architecture for network-to-network signaling. (Voice over IP Fundamentals, Davidson and Peters (Cisco Press, 2000), Chapters 1 and 5, the disclosure of which is specifically incorporated herein by reference, provides a general description of SS7 and the PSTN.) The process begins when the party making the call dials the telephone number of the desired phone line. This causes the calling phone to generate a signal sent over the originating phone line to the switch directly connected with that phone line (the "origination switch"). This relies upon a user-to-network signaling method. If the call is not to another phone line directly connected to the origination switch, a signal is sent from the origination switch to a switch connected to the desired phone line (the "terminating switch"). This relies upon a network-to-network signaling method, and this may require sending a signal through multiple switches and multiple networks. To complete the call, a signal is sent from the terminating switch to the desired phone line. This relies upon a user-to-network signaling method.

Completing a call between two phone lines in the PSTN also requires a number of different steps, and an analysis of the requisite call flow is set forth in Voice over IP Fundamentals, Davidson and Peters (Cisco Press, 2000), pages 14–16. As part of the call flow, the originating phone line must send a setup message to the destination phone line to trigger a ringing of the phone. Before the call is completed, a number of different messages will be sent through the SS7.

The preferred embodiments of the present invention are especially well adapted for use in a PSTN 10 that can rely upon the calling party identification associated with calls transmitted through the SS7 (or some other network-to-network architecture) to identify telemarketing calls. A call can be recognized as a telemarketing call even if the calling party has an unlisted number or is using a caller ID blocked feature because the network architecture must always be able to recognize the calling party identification to complete a call. This also means that undesirable telemarketing calls can be terminated, or diverted, while the original signal is transmitted in a network-to-network signaling method before any such signal is allowed to reach a destination phone line. As a result, telemarketing calls can be prevented from ringing through to phone lines of parties who do not wish to receive such calls, and this can be done without any notification to such parties and without any action by, or disturbance to, such parties.

To achieve these results, before a call is completed or allowed to ring through to a destination phone line, an anti-telemarketing program is used to determine how the call should be handled. The anti-telemarketing program can reside in one or more locations, depending upon designer preference and the system and manner in which it is being used. In an especially preferred embodiment, the anti-telemarketing program compares the calling party identification of an incoming call to a telemarketing database that contains known telemarketing numbers to determine if there is a match between the calling party identification and any of the telemarketing numbers contained in the telemarketing database. This can be done as part of an SS7 system, or any other system that will allow the same function to be performed during network-to-network signal processing. If there is a match, the call is prevented from ringing through to the destination phone line unless an override condition is set, which will be described later.

It would be especially preferred if all phone lines used for telemarketing calls were included within a comprehensive static database, or at least within a comprehensive database updated as new phone lines are used for telemarketing; however, no such comprehensive database presently exists in the United States. Of course, if telemarketers were ever forced to include their phone lines in such a database, or only make telemarketing calls from phone lines identifiable as such, e.g., a telemarketing exchange much like current toll free 800 and 888 exchanges, then such a database could easily become a reality. Another type of database that might be generated is a telemarketing database in which telemarketers voluntarily place their numbers in the database. Although this is not known to exist now, it might become a reality, and telemarketers might even pay to be included in such a database, for reasons that will be described later.

A telemarketing database can also be generated over time based upon simple addition of numbers to the database as they become identified as telemarketing numbers. As the database grows in size, it becomes more accurate, more valuable, and more likely to correctly identify telemarketing numbers. In addition, to prevent the database from becoming stale, it can be periodically revalidated, or regenerated, at preselected intervals. For example, one third of the database might be deleted after a given time interval, such as sixty days. Although this will delete active telemarketing numbers from the database, it will also delete telemarketing numbers that may no longer be telemarketing numbers from the database, and numbers that are still telemarketing numbers will then be reidentified and readded to the database.

Although it is especially preferred that that the telemarketing database contain telemarketing numbers, it is also possible that the telemarketing database might be constructed so as to contain non-telemarketing numbers so that telemarketing calls would be identified by not being in the database. Alternatively, the telemarketing database might contain two types of data, telephone numbers known to be telemarketing telephone numbers and telephone numbers known not to be telemarketing telephone numbers (e.g., police, government agencies, long used corporate or residential telephone numbers, etc.). Such a database offers the additional advantage of insuring that selected telephone calls are not erroneously identified as telemarketing telephone numbers.

In accordance with the present invention, individual users of the system and method of the preferred embodiments can be empowered to add offending telemarketing numbers to a telemarketing database. This methodology capitalizes on the fact that the preferred embodiments are especially well suited to block, or at least selectively screen, telemarketing calls to a large number of individual phone lines. As the number of individual phone lines included within the system or its methodology increases, because such phone lines can be part of a regular and ongoing process of updating the database of known telemarketing numbers, it is statistically less likely that a given telemarketer will actually ring through to a given phone line included within the system. This is why it is especially preferred that the system includes phone lines from multiple area codes.

For ease of reference, an individual user of the system and method of the preferred embodiments will hereinafter be referred to as a subscriber telephone line, while groups of subscriber telephone lines will be referred to as a subscription base. Although it is preferred that individual subscriber telephone lines pay for use of the present invention, a non-paying phone line included within the system would still be considered a "subscription phone line."

As illustrated in FIG. 1, a telemarketer 1 can use a PSTN 10 or some alternate communications network 9 to place a telemarketing call 2,5 or 3,4. If an alternate communications network is used, a PSTN can be accessed by a gateway 11. When the call reaches subscriber 7 in the subscription base and the calling party identification associated with the call does not match a telephone number contained in the telemarketing database 8, the call will be completed without invoking a preselected action other than completing the call to the selected phone line. "Completing" the call means that the call will continue to be processed and that it will be allowed to ring through to the selected line, provided some other procedure or feature is not invoked to block the call (such as, for example, blocking all calls at certain times or blocking calls with caller ID blocked). If the telemarketing call is answered, the answering party can identify the call as a telemarketing call after the call is completed, and the calling party identification associated with the call can be added to the telemarketing database (shown as step 6 in FIG. 1) if one or more preselected criteria for addition to the telemarketing database are met.

If a subscriber does receive a call from a telemarketer, the subscriber can identify the call as such by taking a preselected action following the call. This might be done, for example, by entering a call signal, such as *67, within a preselected time after the telemarketing call is terminated, so that the calling party identification stored in a record associated with the answered call can be processed to determine if it should be added to the telemarketing database.

Many different preselected criteria can be used for deciding whether a calling party identification identified by a subscriber as a telemarketing number should be added to the telemarketing database. Use of such criteria can be automated, through a computer program, and one or more algorithms can be used to implement logic, artificial intelligence, independent verification, or some other means, or a combination of such means, to confirm that a given calling party identification belongs to a telemarketer or is being used for telemarketing activity. For example, once a single subscriber identifies a single calling party identification as belonging to a telemarketer, a third party could call the identified number to confirm that it does in fact belong to a telemarketer. Although this methodology might appear simple upon initial analysis, it is labor intensive, and therefore expensive. To minimize such expense, in an especially preferred embodiment, suspected telemarketing numbers are saved in a separate file until further confirmation is obtained. If the telemarketing number is identified as a telemarketer by a preselected number of different subscribers within a specified time, it will be identified as belonging to a telemarketer. Or, if the number passes an initial threshold, it might be targeted for independent verification. And, if any pattern begins to emerge concerning such numbers (e.g., maybe a number of the numbers are concentrated within a certain area code or exchange), such information can be used to more readily identify additional telemarketing numbers. Accordingly, as will be readily apparent to one of ordinary skill in the art in possession of the present disclosure, there are many ways to determine how telemarketing numbers should be identified and added to the telemarketing database based upon input from subscribers.

If a subscriber receives a call from a telemarketer that is contained within the telemarketing database, the call can be terminated by taking a preselected action other than completing the call to the selected phone line. For example, the telemarketer could be sent a call progress tone, such as a signal that the subscriber phone line is busy or that there is no answer. Alternatively, the telemarketer can be provided with a notification that the subscriber at the selected telephone line does not accept calls from telemarketers and be told that the telemarketer should not attempt to make any future calls to that number. If the latter action is invoked, a record can be generated to indicate that the message has been given to the telemarketing number that called the subscriber line, and an anti-telemarketing flag indicating such could be triggered in a database file. By checking for such flags, it is possible to identify when the same telemarketing number calls the subscriber line again despite having received an anti-telemarketing message. Should this occur, a predetermined course of action might be taken against the telemarketer. Depending upon the circumstances, such action might include reporting the second call to an appropriate authority (if such a repeat call is prohibited), or preventing the telemarketer from calling any subscriber even if certain subscribers previously indicated a willingness to receive a call from the telemarketer by triggering an override condition for the telemarketer.

The concept of an override condition in a logical telemarketing database adds a great deal of flexibility and versatility to the system and methodology and permits the concepts of targeted telemarketing and selective blocking. Conceptually, an override condition could be triggered for a given number, a group of numbers, or be tied to a given characteristic. Somebody other than a subscriber, such as a party operating the system, might trigger an override condition. Alternatively, a subscriber might trigger an override condition.

The party operating the system might want the ability to invoke a control system override to allow one or more telemarketing lines contained in the telemarketing database to have access to one or more subscriber lines. One use of this is to collect revenue from telemarketers granted this access. Another use of this is to identify subscribers willing to accept calls from certain telemarketers, or under certain conditions. For example, subscribers willing to subject themselves to telemarketing calls under certain circumstances might be given free service, a reduction in their service cost, or they might even be paid for listening to such calls.

An individual subscriber might want the ability to invoke an override condition for several reasons. For example, the subscriber might receive incentives to do so. Alternatively, the subscriber might want to be able to receive certain types of telemarketing calls, such as calls soliciting money for a favorite charity, or calls promoting specific goods or services. There might also be personal reasons why a subscriber might want to accept a certain telemarketing call, such as when the subscriber knows that a friend or relative is engaged in telemarketing activities, and the subscriber wants to receive calls from the friend or relative from the phone line also being used for telemarketing activities.

One way to allow an individual subscriber to accept selected telemarketing calls is to allow the subscriber to create a customized subscriber database generated, at least in part, from the telemarketing database. The subscriber database might be customized by selectively varying one or more override conditions for at least one telephone number contained within the customized subscriber database. The subscriber might access the customized subscriber database through any number of means, including computer access through a network, such as the Internet.

Although the foregoing description is illustrative of preferred embodiments of the present invention, it is to be understood that additional embodiments thereof will be obvious to those skilled in the art. For example, although the preferred embodiments are described in the context of using a Public Switched Telephone Network, the concepts can also be used in alternate communications networks, such as the Internet (e.g., through use of voice-over IP).

Accordingly, it will be readily apparent to those skilled in the art that still further changes and modifications in the actual implementation of the concepts described herein can readily be made without departing from the spirit and scope of the invention as defined by the lawful scope of the following claims.

What is claimed is:

1. A method for minimizing undesirable telemarking calls to subscriber telephone lines, comprising the steps of:
    establishing a subscription base of a plurality of subscriber telephone lines;
    obtaining a calling party identification for an incoming call to a selected phone line of a subscriber in the subscription base before the call is allowed to ring through to the selected phone line;
    comparing the calling party identification with a telemarketing database containing a plurality of telemarketing telephone numbers to determine if there is a match between the calling party identification and any of the plurality of telemarketing telephone numbers, and then:
        if there is a match, either taking a preselected action other than completing the call to the selected phone line or completing the incoming call if an override condition is set; and
        if there is no match, completing the incoming call, keeping a record of the calling party identification, allowing the subscriber to designate the incoming call as a telemarketing telephone number, and adding the calling party identification into the telemarketing database if a preselected criterion for addition is met once more than one subscriber identifies the potential telemarketing phone line as a potential telemarketing phone line.

2. A method as recited in claim 1, wherein a portion of the plurality of telemarketing telephone numbers in the telemarketing database is periodically deleted and numbers in said portion are then again added to the telemarketing database once the preselected criterion for addition has been met.

3. A method as recited in claim 2, wherein the telemarketing database includes telephone numbers from more than one area code.

4. A method as recited in claim 1, wherein a party other than the subscriber or the caller can set the override condition.

5. A method as recited in claim 1, comprising the further step of:
    allowing the subscriber to access a customized subscriber database via a computer and selectively vary one or more override conditions for at least one telephone number contained within the customized subscriber database, wherein the customized subscriber database is generated, at least in part, from the telemarketing database.

6. A method as recited in claim 1, wherein the subscriber is allowed to selectively vary an override condition for a selected group of telephone numbers.

7. A public switched telephone network with an anti-telemarketing feature, comprising:
    a network telephony system;
    a subscription base of a plurality of subscriber phone lines from at least two area codes connected by the network telephony system;
    a logical telemarketing database containing a plurality of telemarketing phone lines from at least two area codes;
    a subscriber telemarketing identification mechanism that allows a subscriber to identify a calling party identification as a potential telemarketing phone line;
    telemarketing identification logic that adds the potential telemarketing phone line to the logical telemarketing database as one of the plurality of telemarketing phone lines if a preselected criterion for addition is met once more than one subscriber identifies the potential telemarketing phone line as a potential telemarketing phone line; and
    a control system that takes a preselected action other than completing a call from one of the plurality of telemarketing phone lines to one of the plurality of subscriber phone lines when an incoming call to any of the plurality of subscriber phone lines is identified as being from any of the plurality of telemarketing phone lines and an override condition is not set.

8. An anti-telemarketing system for use in a public switched telephone network, comprising:
    a subscription base of a plurality of subscriber phone lines;
    a logical telemarketing database containing a plurality of telemarketing phone lines;
    a subscriber telemarketing identification mechanism that allows a subscriber to identify a calling party identification as a potential telemarketing phone line;
    a telemarketing identification mechanism that can add an identified potential telemarketing phone line to the logical telemarketing database as one of the plurality of telemarketing phone lines if a preselected criterion for addition is met once more than one subscriber identifies the potential telemarketing phone line as a potential telemarketing phone line; and a control system that takes a preselected action other than completing a call from one of the plurality of telemarketing phone lines to one of the plurality of subscriber phone lines when the call is identified as originating from one of the plurality of telemarketing phone lines.

9. Th public switched telephone network recited in claim 7, further comprising:

telemarketing database control logic that deletes a preselected portion of the plurality of telemarketing phone lines from the logical telemarketing database after a given time interval.

10. The anti-telemarketing system recited in claim 8, further comprising:

telemarketing database control logic that deletes a preselected portion of the plurality of telemarketing phone lines from the logical telemarketing database after a given time interval.

* * * * *